(12) United States Patent  
Jung et al.

(10) Patent No.: US 9,182,502 B2  
(45) Date of Patent: Nov. 10, 2015

(54) ANALYSIS APPARATUS FOR HIGH ENERGY PARTICLE AND ANALYSIS METHOD USING THE SAME

(71) Applicant: Electronics and Telecommunications Research Institute, Daejeon (KR)

(72) Inventors: Moon Youn Jung, Daejeon (KR); Nam Soo Myung, Seongnam (KR); Dong-Ho Shin, Daejeon (KR); Hwang Woon Lee, Daejeon (KR); Dong Hoon Song, Daejeon (KR); Seunghwan Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 254 days.

(21) Appl. No.: 13/873,708

(22) Filed: Apr. 30, 2013

(65) Prior Publication Data

US 2013/0299706 A1    Nov. 14, 2013

(30) Foreign Application Priority Data

May 8, 2012    (KR) .................. 10-2012-0048689

(51) Int. Cl.  
*G01T 1/20* (2006.01)  
*G01N 15/14* (2006.01)  
*G01N 23/20* (2006.01)  
*B82Y 15/00* (2011.01)

(52) U.S. Cl.  
CPC ................. *G01T 1/2002* (2013.01); *G01T 1/20* (2013.01); *B82Y 15/00* (2013.01)

(58) Field of Classification Search  
CPC ......... G01T 1/2002; G01T 1/20; B82Y 15/00  
USPC .............................................. 250/361 R, 362  
See application file for complete search history.

(56) References Cited

U.S. PATENT DOCUMENTS

2009/0050812 A1* 2/2009 Dunleavy et al. ............. 250/368  
2012/0248320 A1* 10/2012 Wangerin et al. ........ 250/363.05

* cited by examiner

*Primary Examiner* — Mark R Gaworecki

(57) ABSTRACT

Provided is an analysis apparatus for a high energy particle and an analysis method for a high energy particle. The analysis apparatus for the high energy particle includes a scintillator generating photons with each unique wavelength by the impinging with a plurality of kinds of accelerated high energy particles, a parallel beam converting unit making the photons proceed in parallel to one another, a diffraction grating panel making the photons proceeding in parallel to one another enter at a certain angle, and refracting the photons at different angles depending on each unique wavelength, and a plurality of sensing units arranged on positions where the photons refracted at different angles from the diffraction grating panel reach in a state of being spatially separated, and detecting each of the photons.

20 Claims, 6 Drawing Sheets

ANALYSIS APPARATUS FOR HIGH ENERGY PARTICLE AND ANALYSIS METHOD USING THE SAME

CROSS-REFERENCE TO RELATED APPLICATIONS

This U.S. non-provisional patent application claims priority under 35 U.S.C. §119 of Korean Patent Application No. 10-2012-0048689, filed on May, 8, 2012, the entire contents of which are hereby incorporated by reference.

BACKGROUND OF THE INVENTION

The present invention disclosed herein relates to an analysis apparatus for high energy particle and an analysis method using the same, and more particularly, to an analysis apparatus and an analysis method for measuring and analyzing the kind and energy of particles in a particle accelerator.

There was important technical advancement that enables overcoming a limit on laser output enhancement due to a damage to a medium in the middle of 1980's. This is a chirped pulse amplification (CPA) technology.

In general, a damage threshold of an optical medium is approximately several $GW/cm^2$. Thus, if a size of a laser beam in a laboratory scale is considered as about 1 cm, a maximum obtainable output is about 1 GW and a focused intensity obtainable in this case is approximately $10^{14}$ $W/cm^2$. Expanding a size of a beam leads just to increasing amplification energy several times but if the CPA technology is used, amplifiable energy increases $10^4$ times under the same condition and thus it is possible to develop laser with a TW-level output by using a laser beam of about 1 cm. In 1990's, when a titanium (Ti) sapphire laser based femto second laser technology was linked to the CPA technology, a laser output was enhanced $10^5$-$10^6$ times, and thus an output, which is able to be generated from large mart-size laser, has been realized on an optical table in a laboratory. At last, a paradigm of high output laser has been changed. As an optical focused intensity reaches about $10^{21}$ $W/cm^2$ exceeding 1,000 times a relativistic region, an ultrashort ultra high output laser technology provides an extreme-condition physical environment which users have not experienced previously, and thus enables new physical phenomena predicted theoretically so far in an extreme-condition physical space to be experimentally explored.

SUMMARY OF THE INVENTION

The present invention provides an analysis apparatus for a high energy particle and an analysis method using the same that may simultaneously measure and analyze the kind and energy of each of high energy particles.

The limitations to be solved by the present invention are not limited to those described above and those skilled in the art will clearly understand other tasks from the following description.

Embodiments of the present invention provide analysis apparatuses for a high energy particle including a scintillator generating photons with each unique wavelength by the impinging with a plurality of kinds of accelerated high energy particles; a parallel beam converting unit making the photons proceed in parallel to one another; a diffraction grating panel making the photons proceeding in parallel to one another enter at a certain angle, and refracting the photons at different angles depending on each unique wavelength; and a plurality of sensing units arranged on positions where the photons refracted at different angles from the diffraction grating panel reach in a state of being spatially separated, and detecting each of the photons.

In some embodiments, the diffraction grating panel may include a diffraction grating on which 500 to 2,000 linear patterns per 1 mm are arranged in parallel to one another.

In other embodiments, the linear patterns may be metallic or insulating materials.

In still other embodiments, the scintillator may include a plurality of components that respond to each of the plurality of kinds of the high energy particles.

In even other embodiments, the components may be 2-dimensionally arranged and each of the components forms one cell.

In yet other embodiments, the maximum width of the cell may be in a range of several nm to several dozens of nm.

In further embodiments, the cell may be formed by a semiconductor processing technique or a material deposition technique and the cells may have a regular arrangement.

In yet further embodiments, the cell may be formed by sintering, and the cells may have an irregular arrangement.

In other embodiments of the present invention, analysis methods for a high energy particle include impinging a plurality of kinds of accelerated high energy particles with a scintillator to generate a plurality of kinds of photons with each unique wavelength; making the photons enter a diffraction grating at a certain angle to refract the photons at different angles depending on each unique wavelength; and detecting the photons refracted and separated at different angles spatially from the diffraction grating, by using a plurality of sensing units, respectively.

In some embodiments, the plurality of sensing units may detect each photon and analyze the number and energy of the accelerated high energy particles qualitatively and quantitatively.

In other embodiments, the analysis methods may further include making the photons proceed in parallel to one another to allow the photons to enter the diffraction grating at a certain angle.

In still other embodiments, the diffraction grating panel may include a diffraction grating on which 500 to 2,000 linear patterns per 1 mm are arranged in parallel to one another.

In even other embodiments, the linear patterns may be metallic or insulating materials.

In yet other embodiments, the scintillator may include a plurality of components that respond to each of the plurality of kinds of the high energy particles.

In further embodiments, the components may be 2-dimensionally arranged and each of the components may form one cell.

In still further embodiments, the maximum width of the cell may be in a range of several nm to several dozens of nm.

In even further embodiments, the cell may be formed by a semiconductor processing technique or a material deposition technique and the cells may have a regular arrangement.

In yet further embodiments, the cell may be formed by sintering, and the cells may have an irregular arrangement.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
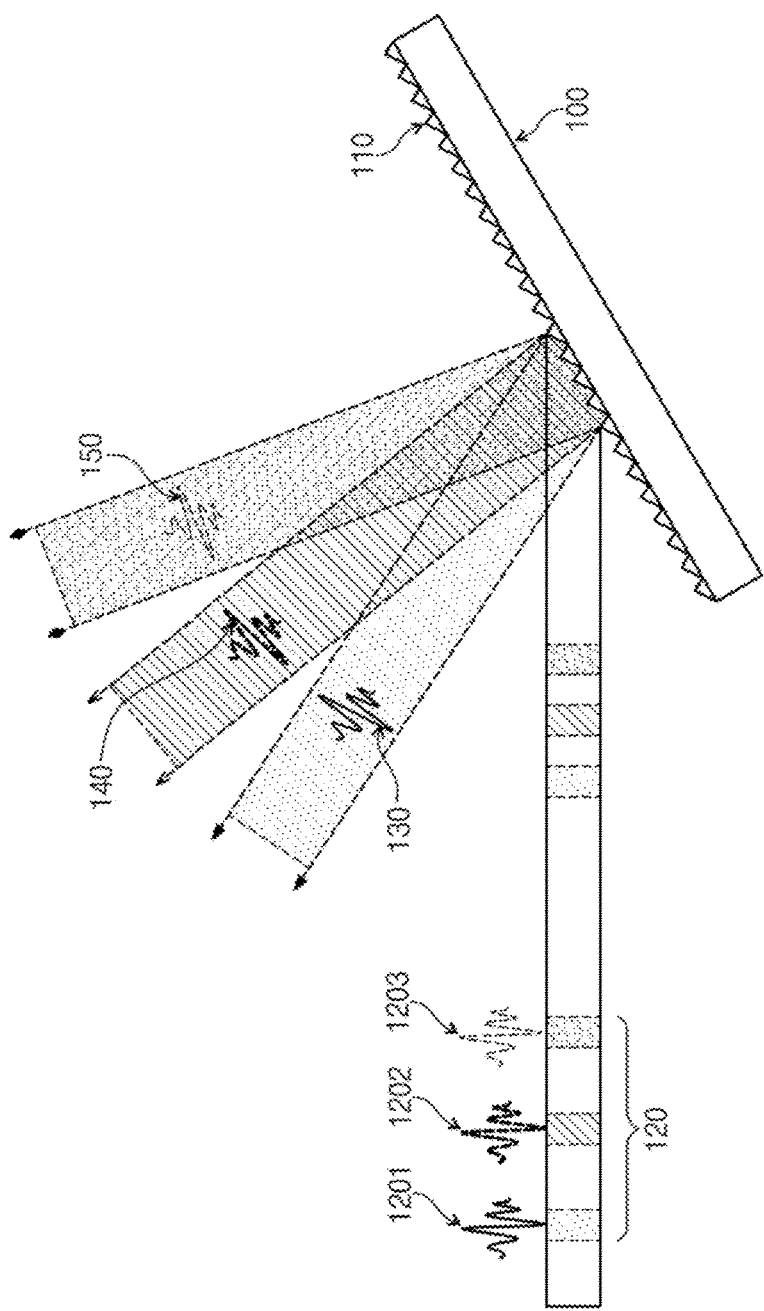
FIG. 1 is a conceptual view of some configurations of an analysis apparatus for a high energy particle according to an embodiment of the present invention.

Hereinafter, the present invention will be described in detail by explaining exemplary embodiments of the invention with reference to the attached drawings. Advantages and features of the present invention, and implementation methods thereof will be clarified through following embodiments described with reference to the accompanying drawings. The invention may, however, be embodied in different forms and can make a variety of changes, and should not be construed as limited to the embodiments set forth herein. Rather, these embodiments are provided so that this disclosure will be thorough and complete, and will fully convey the scope of the inventive concept to those skilled in the art. The present invention is defined only by the scope of claims. Like reference numerals refer to like elements throughout.

The terms in the specification are used to describe embodiments, not to limit the invention. In the specification, a, one or single element includes a plurality of elements unless being otherwise mentioned. The terms 'comprise' and/or 'comprising' in the specification do not exclude the presence or addition of different components, steps, operations and/or devices other than a component, step, operation and/or device that has been mentioned. In addition, since descriptions are made on the basis of exemplary embodiments, reference numerals presented in the order of description are not necessarily limited to the order. When a mention that any film is on another film is made in the specification, the former may be formed directly on the latter film or a third film may also be interposed in between.

Additionally, the embodiments in the detailed description will be described with sectional views and/or plane views as ideal exemplary views of the present invention. In the drawings, a thickness of films and regions is exaggerated for effectively explaining the embodiments. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. For example, a square-shaped etch region may have a round shape or a given curvature. Regions exemplified in the drawings have general properties, and are used to illustrate a specific shape of a device region. Thus, this should not be constructed as limited to the scope of the present invention.

The present invention applies a pulse stretcher of a chirped pulse stretching system that stretches a time of a pulse, to measuring the kind and energy of accelerated high energy particles. In order to obtain a stretching ratio of a short pulse of pico second, a pulse stretcher that is based on a diffraction rating with great angular dispersion is used. The dispersion of the pulse stretcher is a function of a diffraction grating constant, a distance between a diffraction grating and a curved mirror, an incident angle, a diffraction angle, etc. The pulse stretcher uses an Öffner triplet type of a reflective optical system. The Öffner triplet means that a reflective concave mirror with a specific curvature radius and a reflective convex mirror with ½ of the curvature radius of the concave mirror are arranged to make their curvature center match. If a diffraction rating is installed between the curvature center and the concave mirror under such an arrangement, it is possible to configure a pulse stretcher with positive group-delay dispersion (GDD).

The pulse stretcher plays a role in stretching a femto second-level pulse to a pico second-level one. An incident optical beam is refracted spatially differently depending on a wavelength by using a diffraction grating of the pulse stretcher. The present invention uses such a principle of the diffraction grating for measuring and analyzing the kind and energy of accelerated high energy particles.

FIG. 1 is a conceptual view of some configurations of an analysis apparatus for a high energy particle according to an embodiment of the present invention.

Referring to FIG. 1, a titanium-sapphire femto second laser system first needs to temporally widen a pulse width, namely, a femto second pulse to a pico second region in order to increase a laser output. The reason for temporally widening a pulse width is to prevent damage to various optical mediums in the laser system. In the case of a diffraction grating panel 100 of a pulse stretcher, if photons 120 with different wavelengths enter a diffraction grating 110, angles made by refraction of a photon 1201 with a short wavelength, a photon 1202 with an intermediate wavelength, and a photon 1203 with a long wavelength by the diffraction grating 110 are different from one another. As illustrated, since refraction angles are different, the refracted photons 130 to 150 proceed spatially differently. As such, the present invention uses a property that angles refracted by the diffraction grating 110 are different depending on unique wavelength of each of the photons 1201 to 1203. If each of the photons 1201 to 1203 entering the diffraction grating 110 has different information and beams from the photons 130 to 150 refracted by the diffraction grating 110 proceed spatially differently, sensors (see 2301 to 2303 of FIG. 2) able to sense a wavelength of each of the refracted photons 130 to 150 are arranged on such spaces. Thus, it has an advantage in that it is possible to initially separate and separately sense information depending on different unique wavelengths, on the spaces on which the sensors are arranged.

Prior to the present invention is presented, since incident wavelengths 120 exist as dispersed photons 1201 to 1203 at the same time and on the same space, it was difficult to know information on the photons 1201 to 1203 simultaneously. This is because there is no wavelength sensor that may sense a plurality of wavelengths 120 on the same space and at the same time.

Figure 2:
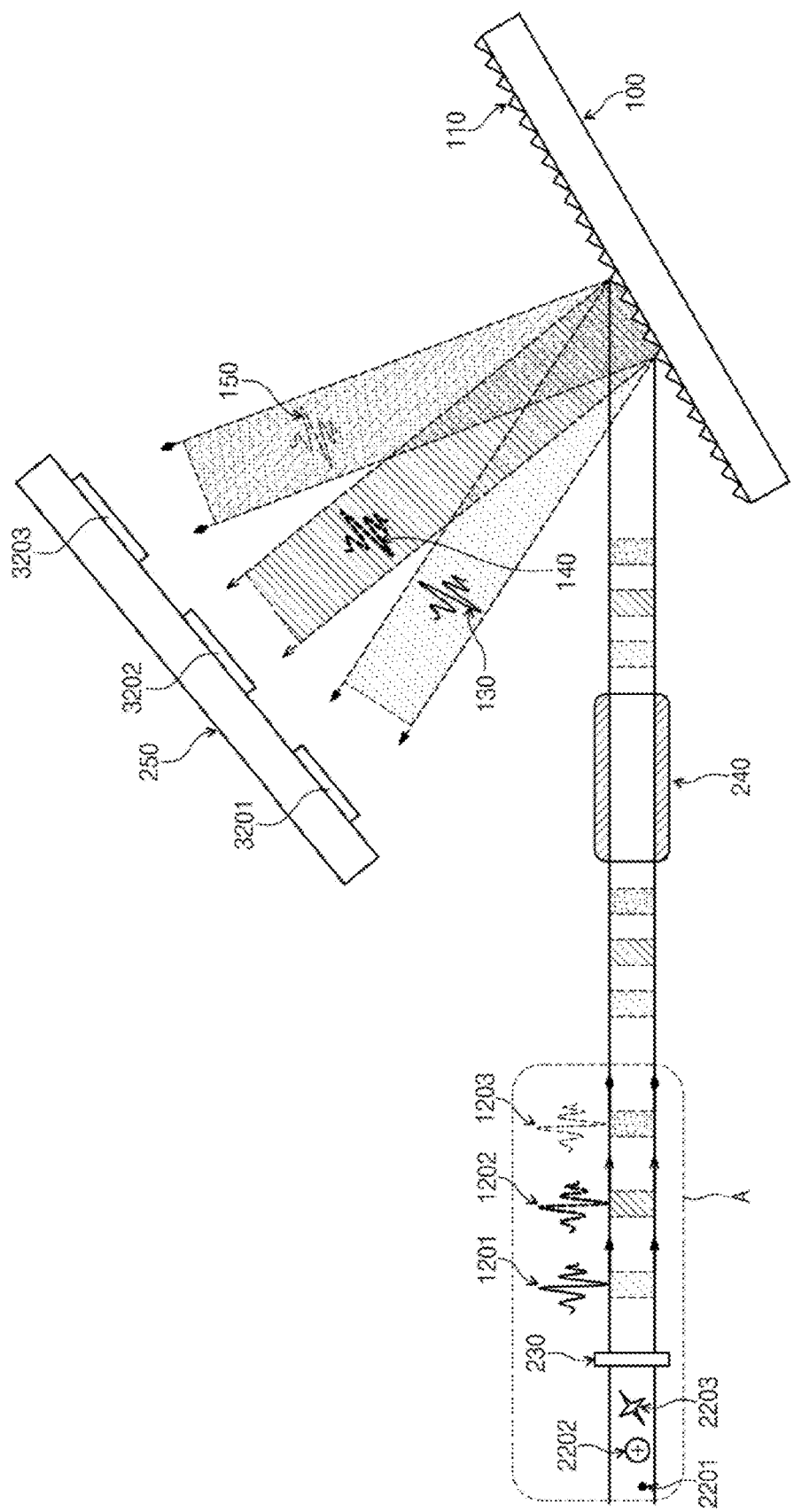
FIG. 2 is a conceptual view of an analysis apparatus for a high energy particle according to an embodiment of the present invention.

FIG. 2 is a conceptual view of an analysis apparatus for a high energy particle according to an embodiment of the present invention.

Referring to FIG. 2, a proton, an X-ray, a gamma ray, etc. are dispersed in a laser ion acceleration device. A plurality of kinds of high energy particles may be generated in a synchrotron depending on the purpose. In this case, it is difficult to measure the kind and energy of a particle simultaneously and precisely.

As an example, it is assumed that three kinds of high energy particles 2201 to 2203 proceed from the left side of FIG. 2 to the right side as shown. For convenience of description, it is assumed that an electron 2201, a proton 2202, and a gamma particle 2203 proceed to the right side. Since information on each of the high energy particles 2201 to 2203 should be converted into a (photon or) wavelength type in the analysis apparatus for the high energy particle of the present invention, the electron 2201, the proton 2202, and the gamma particle 2203 need to be changed to photons 1201 to 1203 with different unique wavelengths. The present invention uses a scintillator 230 as a converting device for changing the high energy particles 2201 to 2203 to the photons 1201 to 1203.

If the three kinds of the high energy particles 2201 to 2203 impinge with the scintillator 230, the scintillator 230 may generate photons 1201 to 1203 with different unique wavelengths. The scintillator 230 may generate the photons 1201 to 1203 with wavelengths uniquely corresponding to each of the high energy particles 2201 to 2203. Detailed descriptions of the scintillator 230 are further made below.

The photon 1201 generated by the electron 2201, the photon 1202 generated by the proton 2202, and the photon 1203 generated by the gamma particle 2203 in the scintillator are well represented in FIG. 2. In FIG. 2, each of the high energy particles 2201 to 2203 proceed from the left side to the right side spatially and simultaneously. For convenience of description, it appears that the high energy particles 2201 to 2203 are on different positions in FIG. 2. The photons 1201 to 1203 generated from the scintillator 230 by the high energy particles 2201 to 2203 also proceed from the left side to the right side simultaneously and on the same space. For convenience of description, it appears that the photons 1201 to 1203 are on different positions in FIG. 2 for convenience of description.

The photons 1201 to 1203 converted by the scintillator 230 to have each unique wavelength may pass through a parallel beam switching unit 240 that changes the photons to parallel beams to enable the photons to enter the diffraction grating 110 at a certain angle.

The photons 1201 to 1203 with different unique wavelengths that reach the diffraction grating 110 are refracted from a surface of the diffraction grating 110. In this case, since the photon 1201 with a short wavelength, the photon 1202 with an intermediate wavelength, and the photon 1203 with a long wavelength have different refractive indexes, their refraction angles are also different from one another. The diffraction grating 110 may have a type in which 500 to 2000 linear patterns per 1 mm are arranged on a surface of the diffraction grating panel 100 in parallel to one another. The linear patterns may be a metallic or insulating material.

Since refraction angles are different, refracted photons 130 to 150 may be spatially completely separated if traveling a certain distance, as shown. In this case, it is possible to obtain information on the photons 130 to 150 depending on each unique wavelength by arranging sensing units 3201 to 3203 on regions where each of the refracted photons 130 to 150 reaches. This is the core of the present invention. Thus, it is possible to calculate the kind and energy of initially dispersed high energy particles 2201 to 2203 qualitatively and quantitatively.

In FIG. 2, the left sensing unit 3201 may be a sensor on a region where the photon 1201 converted by the electron 2201 reaches by its refraction, the intermediate sensing unit 3202 may be a sensor on a region where the photon 1202 converted by the proton 2202 reaches by its refraction, and the right sensing unit 3203 may be a sensor on a region where the photon 1203 converted by the gamma particle 2203 reaches by its refraction.

The present invention uses the electron 2201, the proton 2202, and the gamma particle 2203 as examples and there is no limit on the kind of the high energy particles in the present invention. Thus, the analysis apparatus for the high energy particle according to the present invention may analyze the kind and energy of high energy particles qualitatively and quantitatively in an experiment for generating an accelerated high energy particle.

Figure 3:
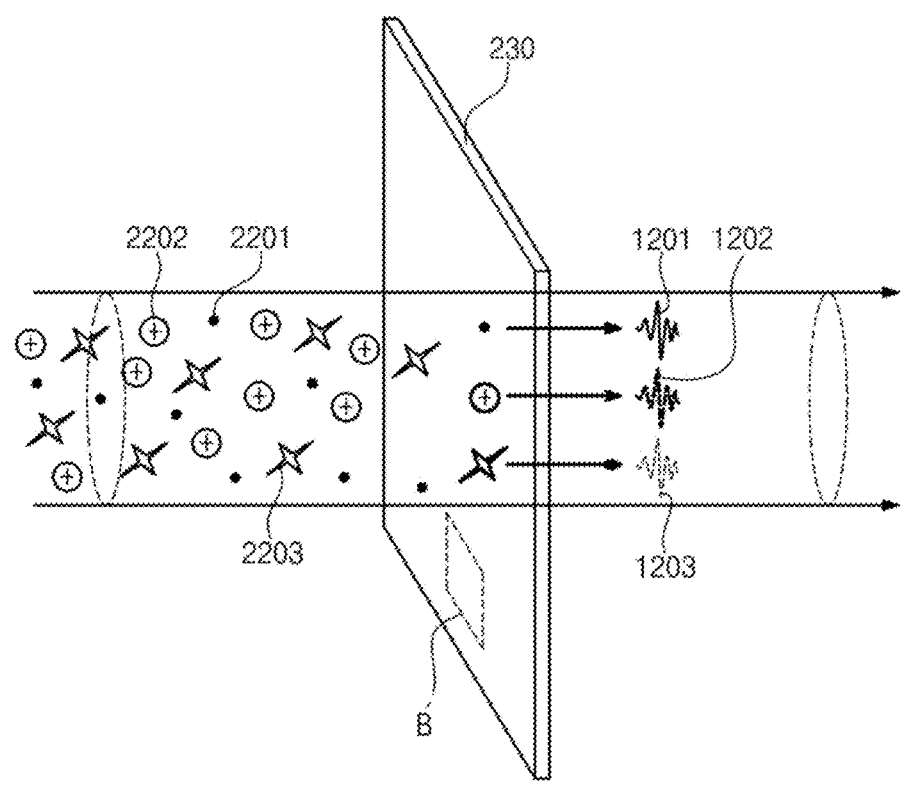
FIG. 3 is an expanded view of a region A of FIG. 2 for explaining some configurations of an analysis apparatus for a high energy particle according to an embodiment of the present invention.

FIG. 3 is an expanded view of a region A of FIG. 2 for explaining some configurations of an analysis apparatus for a high energy particle according to an embodiment of the present invention.

Referring to FIG. 3, it is a view for describing the scintillator 230 in detail by observing the surrounding of the scintillator 230. The high energy particles 2201 to 2230 accelerated from the laser ion acceleration device or the synchrotron proceed from the left side of the scintillator 230 to the scintillator 230.

The photons 1201 to 1203 with unique wavelengths are generated in the scintillator 230 depending on unique property and energy of each of the high energy particles 2201 to 2203. These photons 1201 to 1203 may simultaneously proceed to the right side, enter the diffraction grating (see 110 of FIG. 2) and be refracted at specific angles depending unique wavelengths as described above.

Figure 4:
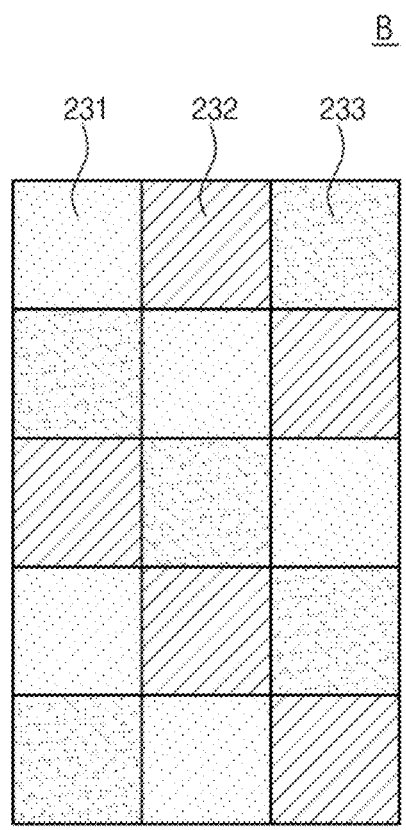
FIGS. 4 and 5 are expanded views of a region B of FIG. 3 for explaining some configurations of an analysis apparatus for a high energy particle according to an embodiment of the present invention.
Figure 5:
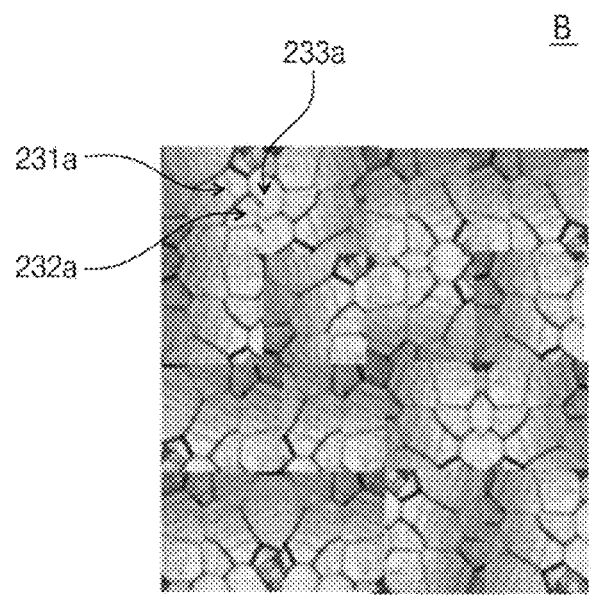

FIGS. 4 and 5 are expanded views of a region B of FIG. 3 for explaining some configurations of an analysis apparatus of a high energy particle according to an embodiment of the present invention.

Referring to FIG. 4, if it is assumed that three kinds of high energy particles exist, the scintillator (see 230 of FIG. 3) may include three kinds of scintillator components 231 to 233.

As an example, the scintillator may include a first component 231 responding to the electron (see 2201 of FIG. 3), a second component 232 responding to the proton (see 2202 of FIG. 3), and a third component 233 responding to the gamma particle (see 2203 of FIG. 3).

The scintillator components 231 to 233 respond to each of the high energy particles in one-to-one correspondence and do not respond to the other high energy particles. The scintillator components 231 to 233 forming the scintillator of the present invention may be 2-dimensionally arranged on a surface of the scintillator. For example, the first component 231 responding to the electron, the second component 232 responding to the proton, and the third component 233 responding to the gamma particle may be formed by a semiconductor processing technique and a material deposition technique very regularly. The present invention does not set a limit on a way of arranging the scintillator components 231 to 233.

A size of each cell in which the scintillator components 231 to 233 are arranged may be small so that its maximum width becomes several dozens of nm. Since a probability that two or more high energy particles simultaneously reach one cell is very low, only one high energy particle may usually reach one cell. Thus, there is no great error in quantizing the number of high energy particles.

Referring to FIG. 5, the scintillator may include a first component 231a responding to a high energy electron, a second component 232a responding to a high energy proton, and a third component 233a responding to a high energy gamma particle, for example.

Unlike FIG. 4, since the scintillator is manufactured by uniformly mixing and sintering the components 231a to 233a, the components 231a to 233a may be arranged irregularly. The present invention does not set a limit on a way of arranging the components 231a to 233a.

Since FIG. 4 uses a semiconductor processing technique, there is a limit on decreasing a size of each cell. However, since FIG. 5 uses a sintering technique, it is possible to make each cell small so that its maximum width becomes several nm. Thus, it is possible to more precisely measure an accelerated high energy particle. Since a probability that one two or more high energy particles simultaneously reach one cell is very low statistically, only one high energy particle may usually reach one cell. Thus, there is no great error in quantizing the number of high energy particles.

Figure 6:
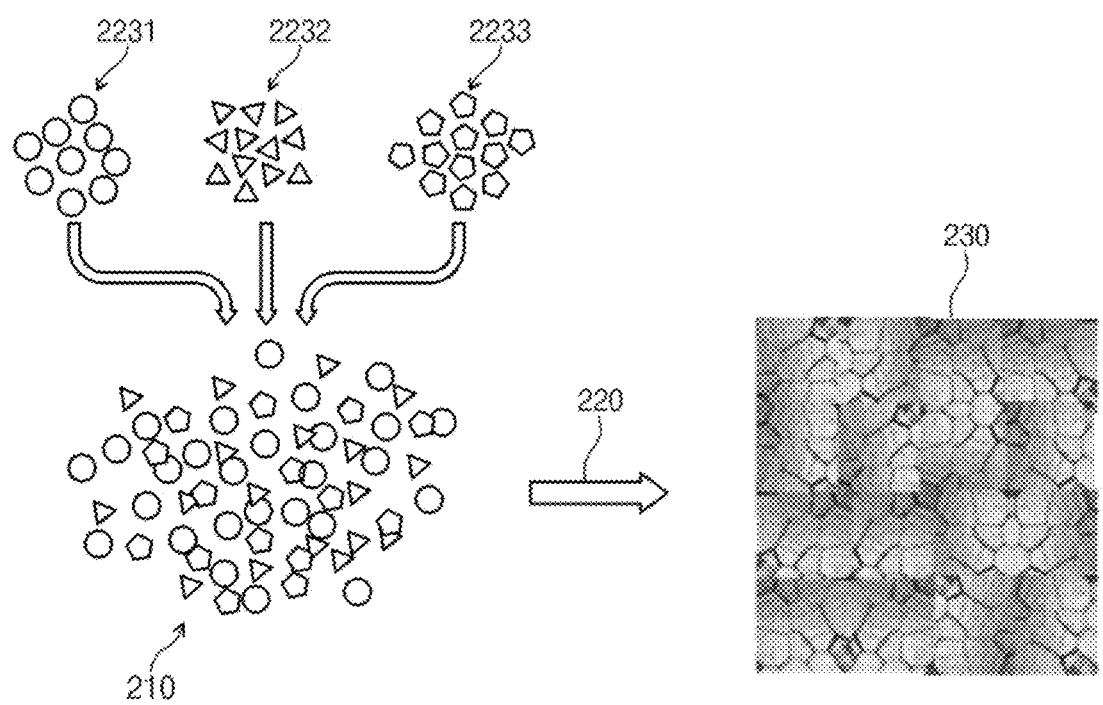
FIG. 6 is a conceptual view of a manufacturing method of some configurations of an analysis apparatus for a high energy particle according to an embodiment of the present invention.

FIG. 6 is a conceptual view of a manufacturing method of some configurations of an analysis apparatus for a high energy particle according to an embodiment of the present invention.

Referring to FIG. 6, a way of forming the scintillator 230 as in FIG. 5 is shown. For example, if a first component 2231 responding to a high energy electron (see 2201 of FIG. 3), a second component 2232 responding to a high energy proton (see 2202 of FIG. 3), and a third component 2233 responding to a high energy gamma particle (see 2203 of FIG. 3) are mixed at the same weight ratio to make a scintillator component mixture 210 and to manufacture it as a plate through a sintering process 220, it is possible to manufacture the scintillator 230 in which the three-kind scintillator components 2231 to 2233 are uniformly dispersed.

The present invention should prevent the scintillator components 2231 to 2233 from becoming melted and mixed due to an excessively high temperature in the sintering process 220. The reason is that if the scintillator components are melted and mixed, each property of the scintillator components 2231 to 2233 responding to each of unique high energy particles disappears.

The present invention does not set a limit on a way of manufacturing the scintillator 230 responding to accelerated high energy particles in one to one correspondence.

Since the analysis apparatus for the high energy particle according to embodiments of the present invention described above includes the scintillator and the diffraction grating, it is possible to convert a plurality of kinds of high energy particles separate into each photon and then spatially separate photons with unique wavelengths from one another. Thus, it is possible to provide the analysis apparatus for the high energy particle that may simultaneously measure and analyze the kind and energy of each of accelerated high energy particles.

Since the analysis method for the high energy particle according to embodiments of the present invention described above includes the scintillator and the diffraction grating, it is possible to convert a plurality of kinds of high energy particles separate into each photon and then spatially separate photons with unique wavelengths from one another. Thus, it is possible to provide the analysis method for the high energy particle that may simultaneously measure and analyze the kind and energy of each of accelerated high energy particles.

While embodiments of the present invention are described above with reference to the accompanying drawings, those skilled in the art will be able to understand that the present invention may be practiced as other particular forms without changing essential characteristics. Therefore, embodiments described above should be understood as illustrative and not limitative in every aspect.

What is claimed is:

1. An analysis apparatus comprising:
   a scintillator generating photons with unique wavelengths by the impinging with a plurality of kinds of accelerated particles;
   a parallel beam converting unit making the photons proceed in parallel to one another;
   a diffraction grating panel making the photons proceeding in parallel to one another enter at a certain angle, and refracting the photons at different angles depending on each unique wavelength; and
   a plurality of sensing units spatially separated and arranged at positions where the photons refracted at different angles from the diffraction grating panel reach, and detecting each of the photons.

2. The analysis apparatus of claim 1, wherein the diffraction grating panel comprises a diffraction grating on which 500 to 2,000 linear patterns per 1 mm are arranged in parallel to one another.

3. The analysis apparatus of claim 2, wherein the linear patterns are metallic or insulating materials.

4. The analysis apparatus of claim 1, wherein the scintillator comprises a plurality of components that respond to each of the plurality of kinds of the accelerated particles.

5. The analysis apparatus of claim 4, wherein the components are 2-dimensionally arranged and each of the components forms one cell.

6. The analysis apparatus of claim 5, wherein the cell is formed by a semiconductor processing technique or a material deposition technique and the cells have a regular arrangement.

7. The analysis apparatus of claim 5, wherein the cell is formed by sintering, and the cells have an irregular arrangement.

8. The analysis apparatus of claim 1, wherein the plurality of kinds of accelerated particles includes a proton, an electron, and a gamma particle.

9. The analysis apparatus of claim 1, wherein the accelerated particles are generated in a synchrotron.

10. An analysis method for a high comprising:
    impinging a plurality of kinds of accelerated particles with a scintillator to generate a plurality of kinds of photons with unique wavelengths;
    making the photons enter a diffraction grating at a certain angle to refract the photons at different angles depending on each unique wavelength; and
    detecting the photons refracted and separated at different angles spatially from the diffraction grating, by using a plurality of sensing units, respectively.

11. The analysis method of claim 10, wherein the plurality of sensing units detect each photon and analyze the number and energy of the accelerated particles qualitatively and quantitatively.

12. The analysis method of claim 10, further comprising making the photons proceed in parallel to one another to allow the photons to enter the diffraction grating at a certain angle.

13. The analysis method of claim 10, wherein the diffraction grating panel comprises a diffraction grating on which 500 to 2,000 linear patterns per 1 mm are arranged in parallel to one another.

14. The analysis method of claim 13, wherein the linear patterns are metallic or insulating materials.

15. The analysis method of claim 10, wherein the scintillator comprises a plurality of components that respond to each of the plurality of kinds of accelerated particles.

16. The analysis method of claim 15, wherein the components are 2-dimensionally arranged and each of the components forms one cell.

17. The analysis method of claim 16, wherein the cell is formed by a semiconductor processing technique or a material deposition technique and the cells have a regular arrangement.

18. The analysis method of claim 16, wherein the cell is formed by sintering, and the cells have an irregular arrangement.

19. The analysis method of claim 10, wherein the plurality of kinds of accelerated particles includes a proton, an electron, and a gamma particle.

20. The analysis method of claim 10, wherein the accelerated particles are generated in a synchrotron.

* * * * *